United States Patent [19]

Hilal

[11] Patent Number: 5,016,600
[45] Date of Patent: May 21, 1991

[54] METHODS OF GENERATING AND CONTROLLING A MAGNETIC FIELD WITHOUT USING AN EXTERNAL POWER SUPPLY SPECIFICATION

[75] Inventor: Mohamed A. Hilal, Madison, Wis.

[73] Assignee: International Superconductor Corp., Riverdale, N.Y.

[21] Appl. No.: 305,372

[22] Filed: Feb. 1, 1989

[51] Int. Cl.$^5$ .......................... F41B 6/00; H01F 36/00
[52] U.S. Cl. ........................................ 124/3; 323/360; 336/DIG. 1; 505/870; 505/880
[58] Field of Search ................. 323/360; 336/DIG. 1; 124/3

[56] References Cited

U.S. PATENT DOCUMENTS

| | | | |
|---|---|---|---|
| 3,143,720 | 8/1964 | Rogers | 323/360 |
| 3,701,906 | 10/1972 | Denel | 336/DIG. 1 |
| 4,429,612 | 2/1984 | Tidman et al. | 124/3 |
| 4,432,333 | 2/1984 | Kurherr | 124/3 |
| 4,753,153 | 6/1988 | Jasper | 124/3 |
| 4,764,837 | 8/1988 | Jones | 323/360 |
| 4,796,511 | 1/1989 | Eyssa | 124/3 |
| 4,817,494 | 4/1989 | Cowan | 124/3 |
| 4,833,965 | 5/1989 | Jasper | 124/3 |
| 4,840,106 | 6/1989 | Jasper | 124/3 |
| 4,858,511 | 8/1909 | Jasper | 124/3 |
| 4,858,512 | 8/1989 | Jasper | 124/3 |

Primary Examiner—Steven L. Stephan
Assistant Examiner—Jeffrey Sterrett
Attorney, Agent, or Firm—Herbert Dubno

[57] ABSTRACT

A system, based on superconducting wires and elements, is used to rapidly generate magnetic field intensities at designated points. The apparatus consists of primary and secondary magnet windings, especially arranged so as to produce rapidly increasing magnetic fields. The primary magnet, located at a distance from the operating area, is charged prior to operation, thus producing a low magnetic field at the said area. Energy transfer to the secondary winding is initiated by induction from the primary winding, thus causing transfer to current to produce a high magnetic field in the said area. This system has many applications, including uses as reconnection-guns and electromagnetic launchers.

16 Claims, 12 Drawing Sheets

METHODS OF GENERATING AND CONTROLLING A MAGNETIC FIELD WITHOUT USING AN EXTERNAL POWER SUPPLY SPECIFICATION

FIELD OF INVENTION

This relates to methods and apparatus based on high critical temperature superconducting elements and coils, wherein a rapidly increasing magnetic field can be initiated and sustained.

BACKGROUND OF THE INVENTION

The discovery of high critical temperature ceramic compositions having superconducting properties is of recent origin. Originally, superconductivity was observed in mercury at 4 K by the Dutch scientist, Heike Onnes. The term, superconductivity, refers to the property wherein a normally resistive conductor abruptly loses all resistance to electrical flow at a specific temperature, called the critical temperature, $T_c$. At this point, the resistivity of the normal conductor becomes zero, or superconducting. In more recent times, niobium metal alloys have been used in superconducting coils at temperatures up to 23 K. It has been believed that superconductivity above 23 K. was not possible. This belief was based on the theoretical work of Bardeen, Cooper and Schieffer (BCS theory-1946) which predicted such a limit. Several theoretical proposals were presented in the 1970's, suggesting that the critical temperature for superconductivity could be increased. However, the lack of any discoveries of superconductivity above 23 K solidified the belief that indeed this temperature could not be exceeded. Thus, in November, 1986, when Bednorz and Miller announced the discovery of a new ceramic superconducting compound based on lanthanum, barium, and copper oxides, whose critical temperature for superconductivity was close to 35 K., (G. Bednorz and A. Müller, Z. Phys., B64 189 (1986)), the declaration was greeted with considerable scepticism. Nevertheless, by the following month, the critical temperature, $T_c$, for the onset of superconductivity was raised to nearly 80 K by C. W. Chu and coworkers (M. K. Wu, J. R. Ashburn, C. J. Tang, P. H. Hor, R. L. Meng, L. Gao, Z. J. Huang, Y. Q. Wang and C. W. Chu, Phys. Rev. Lett. 58 908 (1987)). This was achieved by changing the composition to yttrium barium copper oxide, approximated by the formula:

$$Y_{1.0} Ba_{1.8} Cu_{3.0} O_{6.3}$$

This formula, determined experimentally, is not exactly stoichiometric. It is believed that this lack of specific nonstoichiometry contributes most to the onset of superconductivity. The so-called 1:2:3 compound, composed of Y-Ba-Cu-O atoms, is prepared by the solid state reaction of the requisite oxides, vis:

$$Y_2O_3 + 2BaO + 3 CuO = 2 YBa_2Cu_3O_{6.5}.$$

It is now established (C. N. Rao et al, Nature, 327 185 (1987)) that high $T_c$ superconductivity in the Y-Ba-Cu-O system originates from a compound of stoichiometry: $YBa_2Cu_3O_{7-\pi}$, where "$\pi$" is a value less than 1.0. This compound has the structure of the ideal perovskite, $YBa_2Cu_3O_9$. Thus, the superconductor $YBa_2Cu_3O_{7-\pi}$ has about 25% fewer oxygen atoms present in the lattice as compared to the idealized cubic perovskite structure. This massive oxygen deficiency means that instead of the conventional three-dimensional crystalline cubic-stacking array of the perovskite, a unique layered structure results. A loss of even more oxygen atoms in this structure gives rise to the semiconductor, $YBa_2Cu_3O_6$. The chain of copper atoms associated with a chain of oxygen atoms is believed to be the key to superconducting behavior. Yet the above description is an idealized one and the actual distinct structural conformation has not yet been delineated. Note that there appear to be extra oxygen atoms in the superconducting unit cell, compared to that of the semiconductor.

To date, most of the high-$T_c$ superconducting ceramic compositions announced to date are based on cuprate compounds having $Cu$-$O_2$ layers as part of the structure. Some of these have included:

Bismuth Strontium Calcium Copper Oxide $$Bi_2Sr_{3-x}Ca_xCu_2O_{8+y}$$

$$T_c = 114 \pm K.$$

Thallium Calcium (Barium) Copper Oxide

| Tl | Ba$_2$ | Ca  | Cu$_2$ | O$_7$  |
|----|--------|-----|--------|--------|
| Tl | Ba$_2$ | Ca$_2$ | Cu$_3$ | O$_9$  |
| Tl | Ba$_2$ | Ca$_3$ | Cu$_4$ | O$_{11}$ |
| Tl | Ba$_2$ | Ca$_4$ | Cu$_5$ | O$_{13}$ |
|    |        | $T_c$ = 120 K. |    |    |

Lead Strontium Lanthanide Copper Oxide $$Pb_2Sr_2 (Nd_{0.76}Sr_{0.24}) Cu_3O_{8+x}$$

$$T_c = 77 K.$$

In the last compound given, the $CuO_2$-sheets are present but there is also a PbO-Cu-OPb sandwich as well, not observed in ceramic superconductors heretofore. The copper ions in this sandwich are monovalent and each is coordinated, above and below, to two oxygen atoms in the PbO layers. The copper atoms in the $CuO_2$ sheets have an average valence of about 2.25, which is consistent with previously discovered cuprate compounds, given above. However, the presence of $Cu^+$ atoms lowers the average valence of copper ions in the new structure to below 2.0, which is atypical. Indeed, preparation conditions needed to prepare these compounds include a mildly reducing atmosphere so as not to oxidize $Pb^{2+}$ to $Pb^{4+}$.

There have also been some copper-free compositions announced, vis:

$$BaO - K_2O - Bi_2O_3$$

This compound is said to become superconducting at about 30 K. While copper-oxide superconductors exhibit layered structures that carry current efficiently only along certain planes, this new material is a three-dimensional network of bismuth and oxygen with properties that are much less sensitive to crystallographic direction. It is hoped that compositions will be discovered in this system with temperature properties that rival those of copper-bearing compounds.

The main advantage to superconducting compositions with higher $T_c$ values is that they should perform better, i.e.—carry higher currents, when cooled to liquid nitrogen temperatures (78 K.). Superconducting ceramic compositions are normally prepared by weighing out specific quantities of selected oxides. The combination is thoroughly mixed by conventional means and then fired at elevated temperatures above about 950° C. The induced solid state reaction causes the formation of the desired ceramic composition and structure. Further annealing in an oxygen atmosphere has been shown to improve the superconducting properties of the Y-Ba-Cu-O compound. The powder so-produced is then processed by conventional means to form a bar (by compaction) which is then used as the superconducting medium.

There are many applications which require the generation of rapidly increasing magnetic fields. It is rather straightforward to produce a decaying magnetic field. This can be easily achieved by charging the electromagnet winding slowly, using a combination of low current and low voltage from an external power supply. By using an external or an internal resistance in series with the magnet windings, one can force the current to decay, thus producing the required decreasing magnetic field. A rapidly increasing magnetic field can only be conventionally generated by charging the magnet quickly but requires the use of a very large power supply. For example, a 10 megajoule magnet requires a 100 megawatt power supply to charge it in one millisecond. I have found that the same field increase can be achieved by the use of my new invention wherein high critical temperature superconducting coils are arranged so as to permit energy and power transfer between coils, thus permitting the generation of a rapidly increasing magnetic field. I have further discovered that this operation is within the scope of the instant invention and can be achieved without the use of an abnormally large megawatt power supply, as has been employed in the prior art.

OBJECT OF THE INVENTION

Therefore, an object of the invention is to provide a method of generating rapidly increasing magnetic fields.

Another object is to provide rapidly varying magnetic fields whose undulations exceed any possible heretofore.

Still another object is to provide an apparatus which is capable of generating magnetic fields whose field intensities vary according to desired cycles.

Another object is to present apparatus capable of producing rapidly increasing magnetic fields without the use of extremely large external power supplies.

A final object is to provide apparatus wherein specific areas contain rapidly increasing magnetic fields, useful in the construction of electromagnetic launchers and reconnection-guns.

SUMMARY OF THE INVENTION

The apparatus consists of primary and secondary magnet windings, especially arranged so as to produce the transient magnetic field. The primary magnet, located at a distance from the operating area, is charged prior to operation, thus producing a low magnetic field gradient at the said area. Energy transfer to the secondary winding is initiated by induction from the primary winding, thus causing transfer of current to produce a high magnetic field gradient in the said area.

BRIEF DESCRIPTION OF THE DRAWING

This invention relates to apparatus capable of generating rapidly increasing magnetic fields. This invention also relates to apparatus incorporating high critical temperature superconducting elements and coils, wherein extremely large external power supplies are not required to generate the said fields.

The novel features which I believe to be characteristic of my new and improved invention will be better understood by reference to the following description taken in connection with the accompanying drawing which represents particular embodiments of my invention.

DRAWINGS

Figure 1:
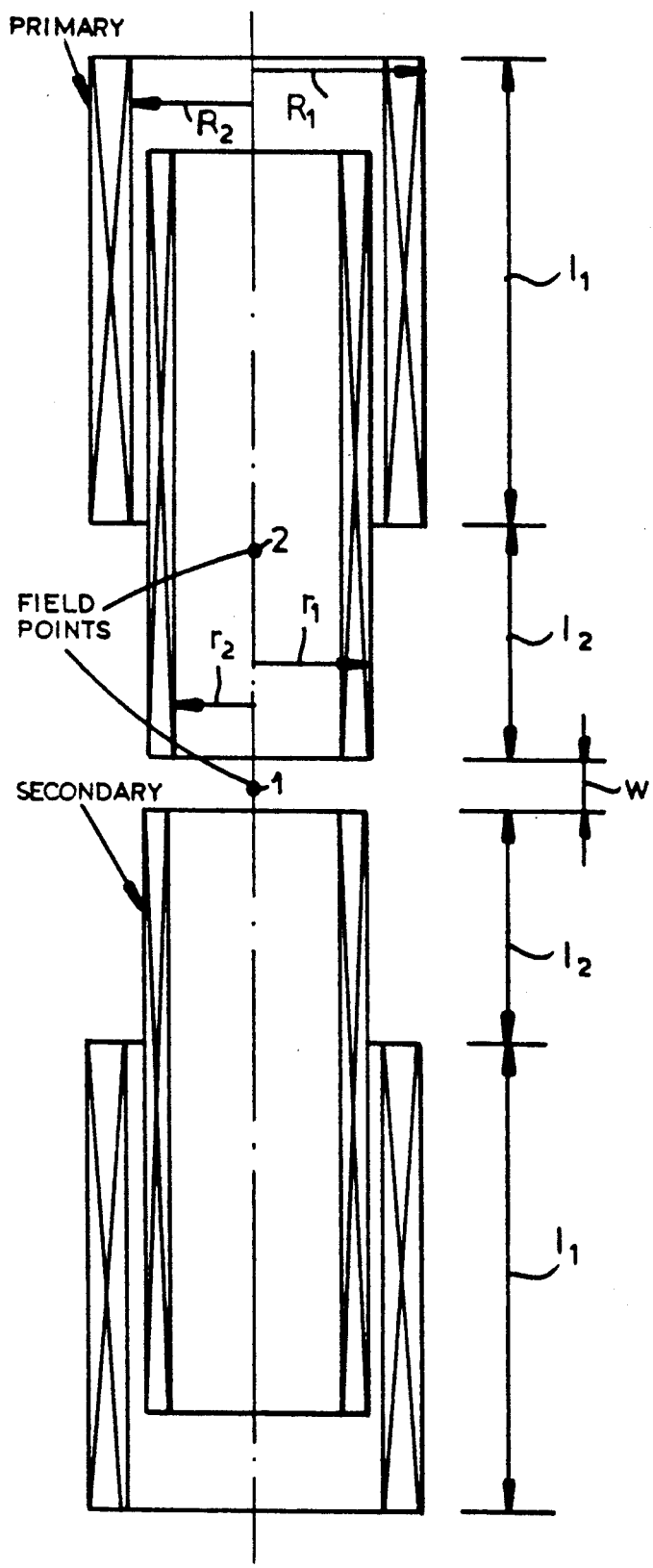
Figure 2:
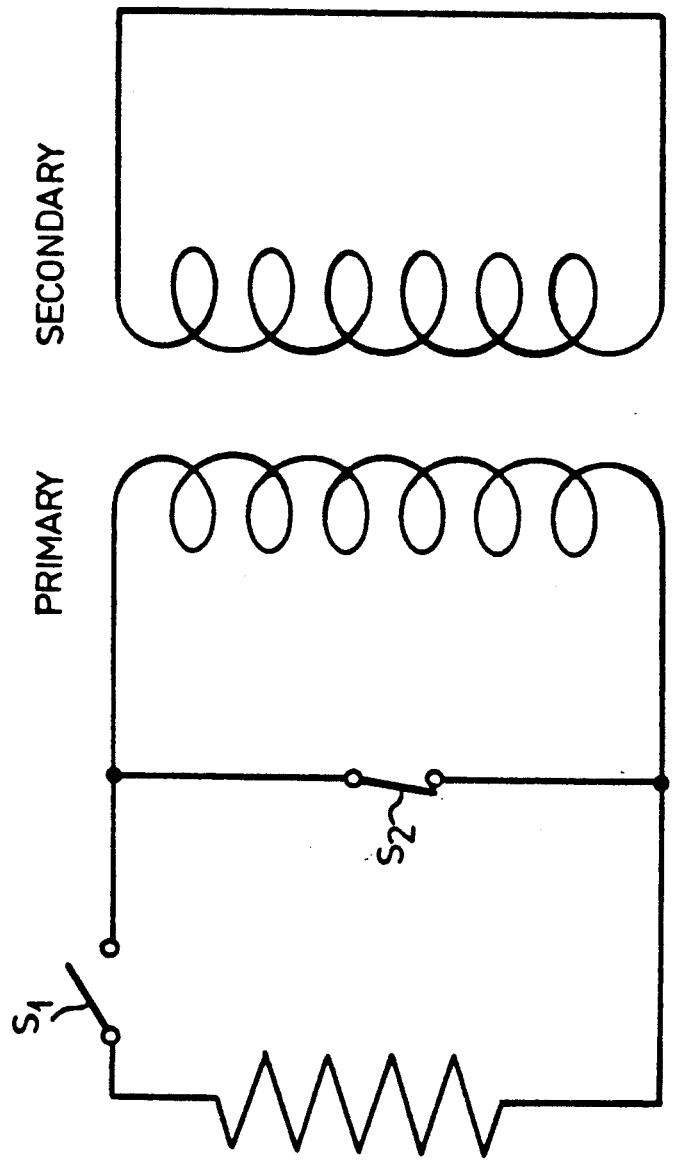
Figure 3:
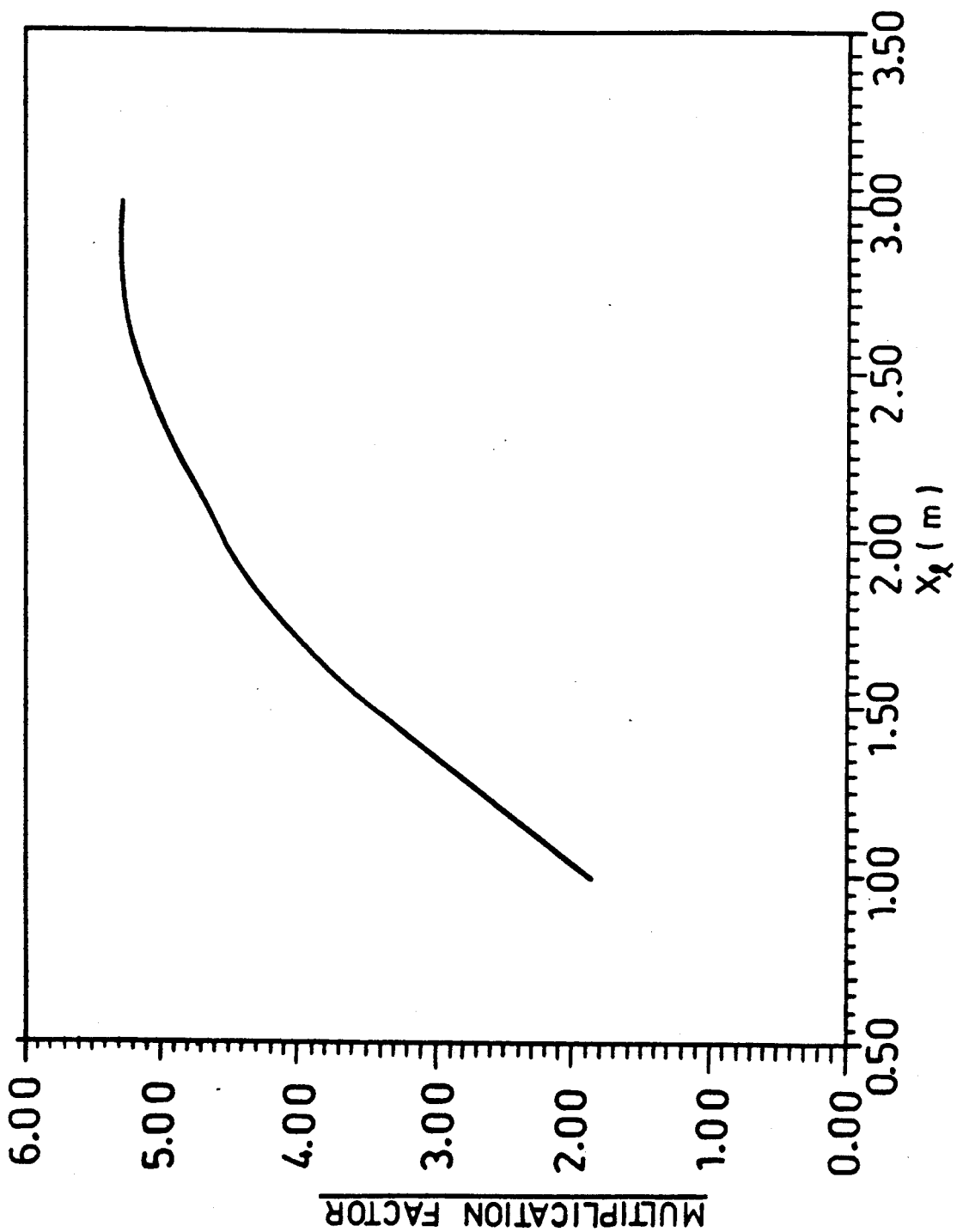
Figure 4:
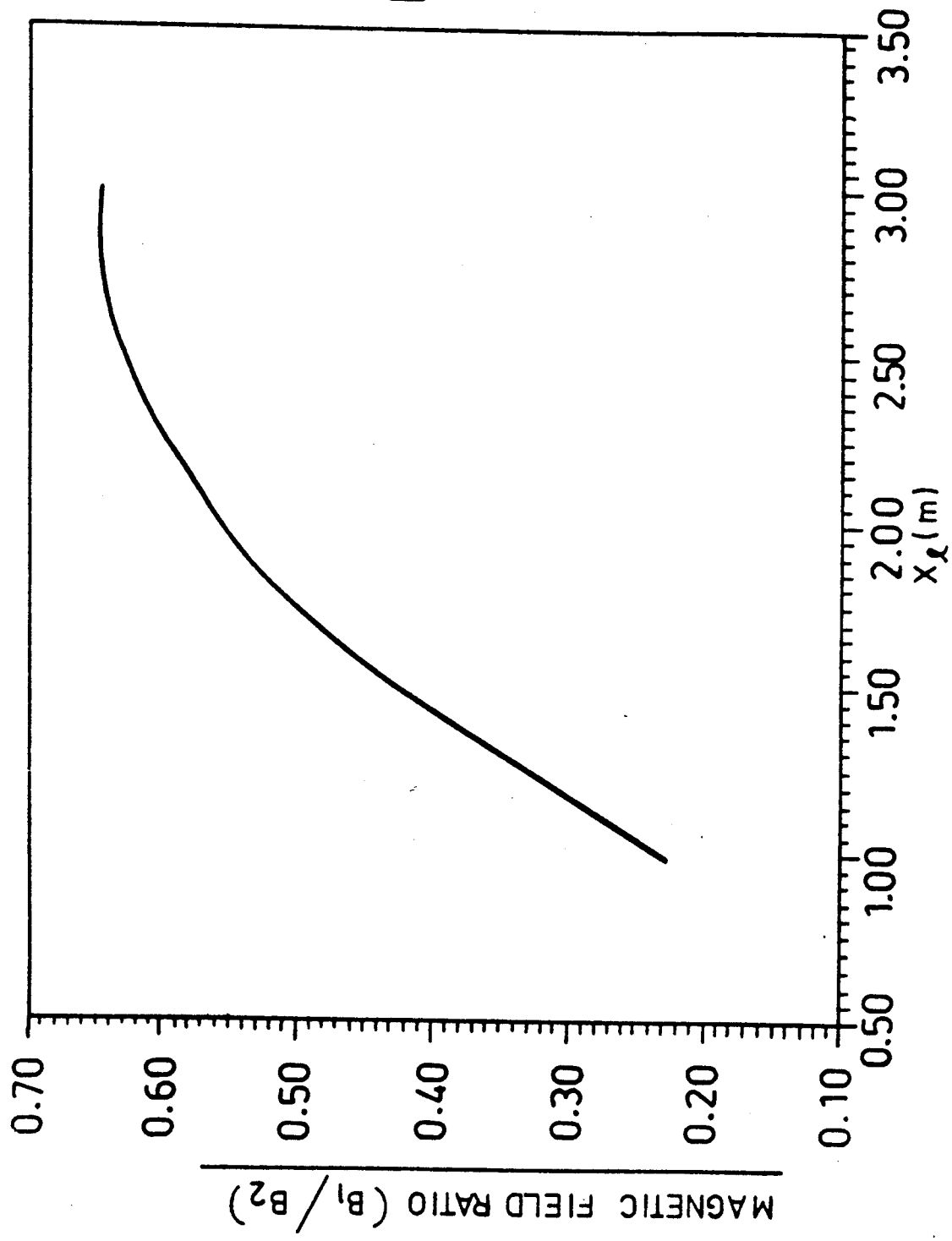
Figure 5:
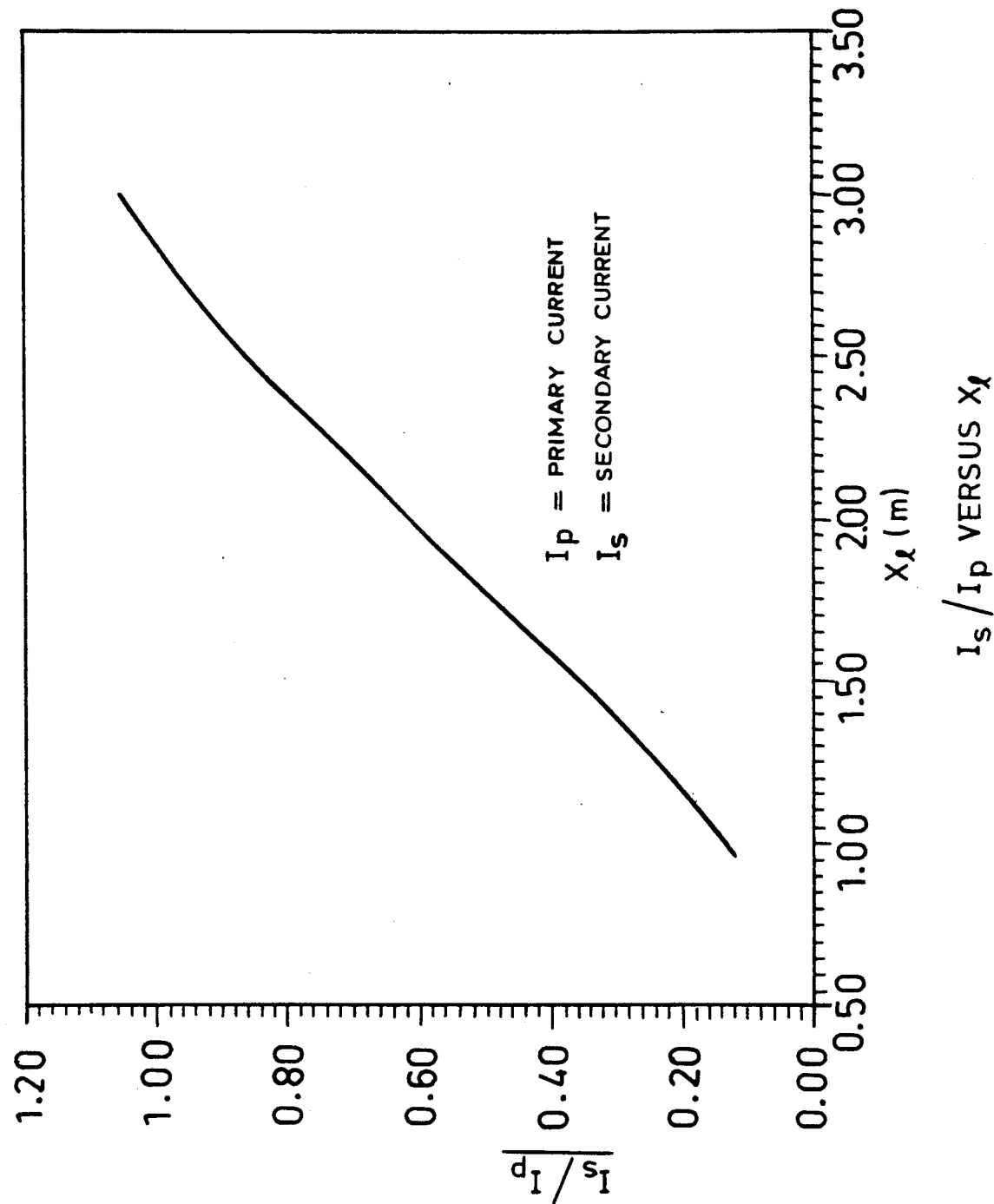

FIG. 1 is an overall schematic of the system and apparatus FIG. 2 shows the electrical circuit representing the system of my new invention;

FIG. 3 is a graph which shows the magnetic field; multiplication factor and how the magnetic field increases as a function of the secondary winding height, x;

FIG. 4 is a graph which shows the magnetic field reduction due to the use of the secondary coil;

FIG. 5 is a graph which shows the ratio of the secondary to the primary current.

Figure 6:
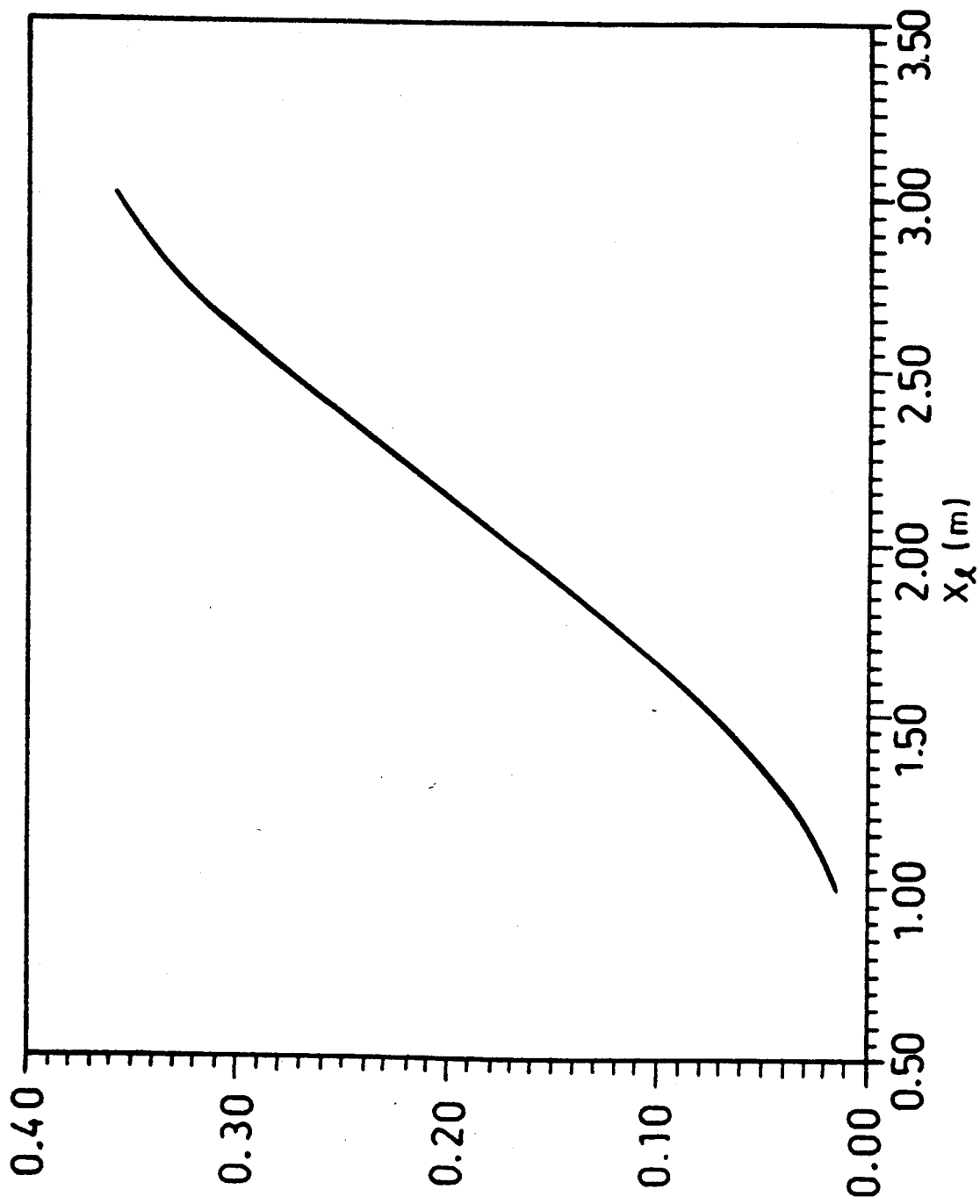
Figure 7:
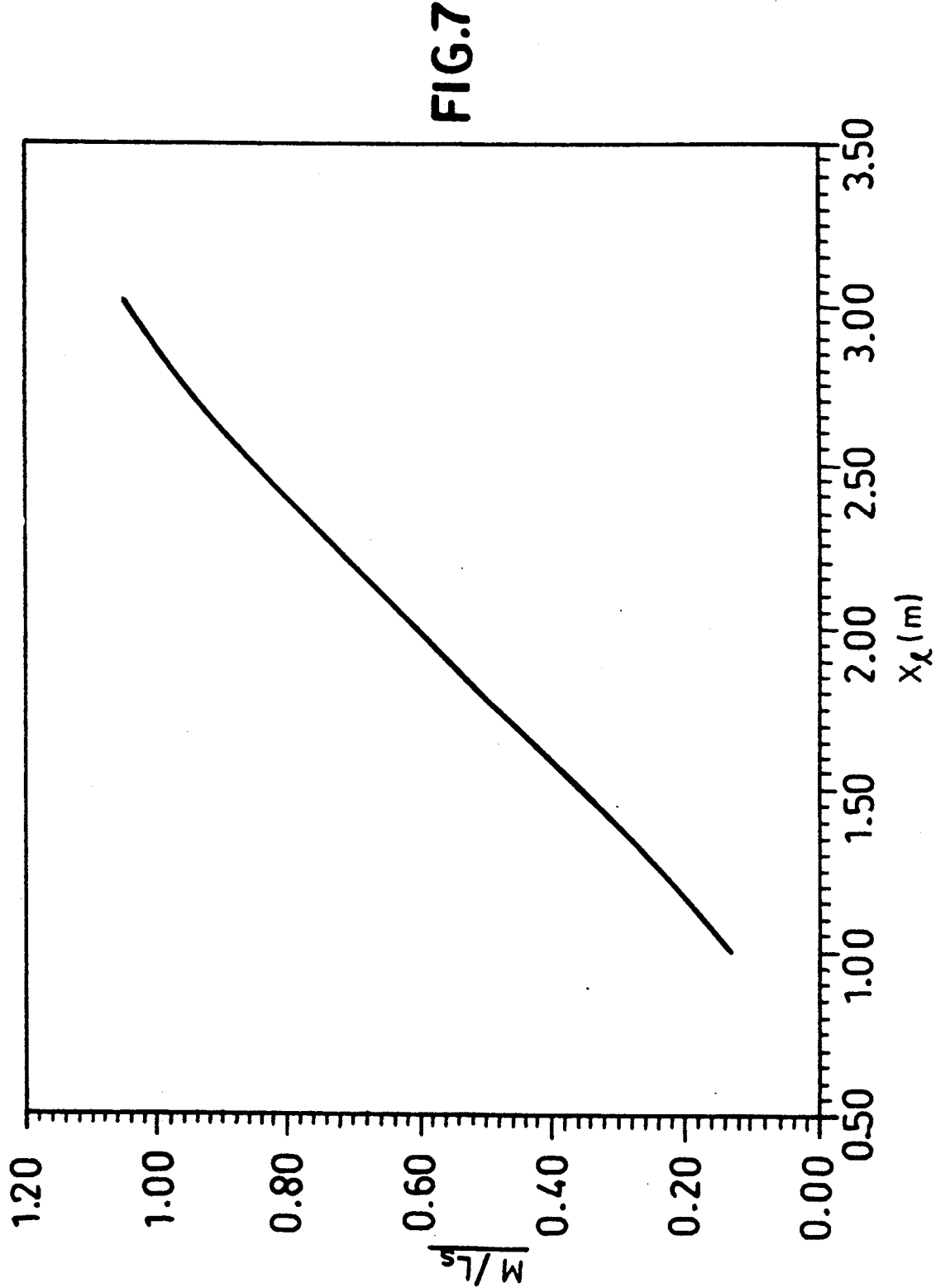
Figure 8:
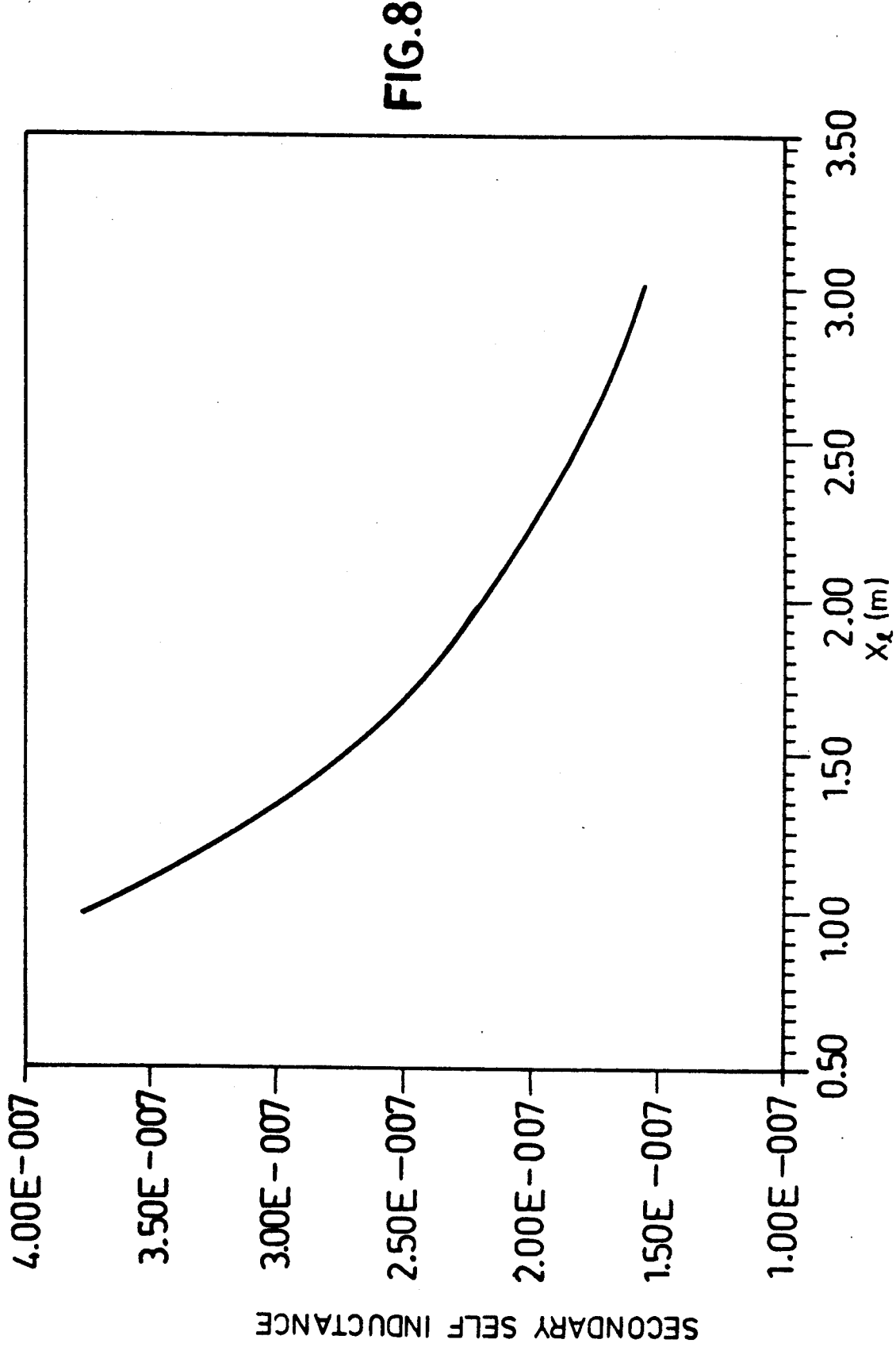
Figure 9:
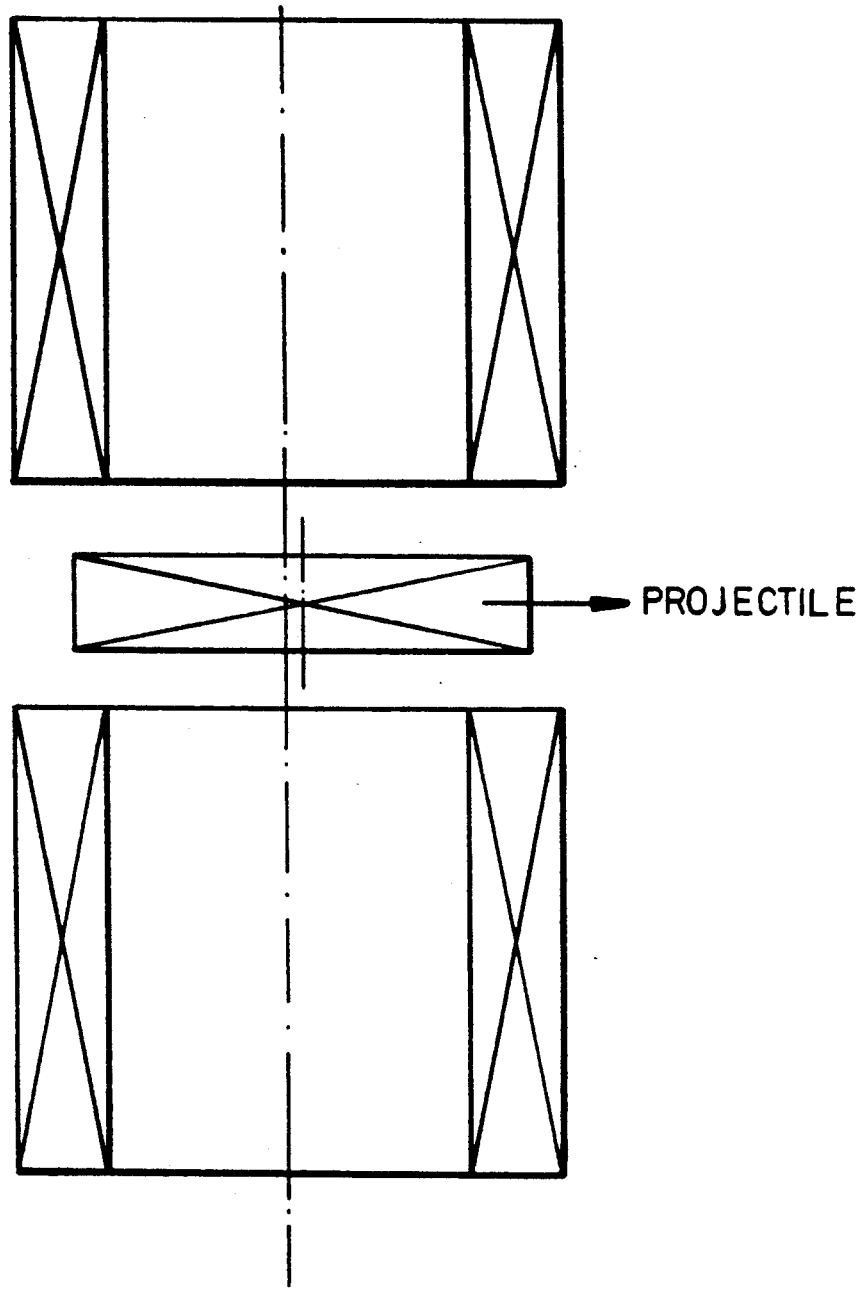
Figure 10:
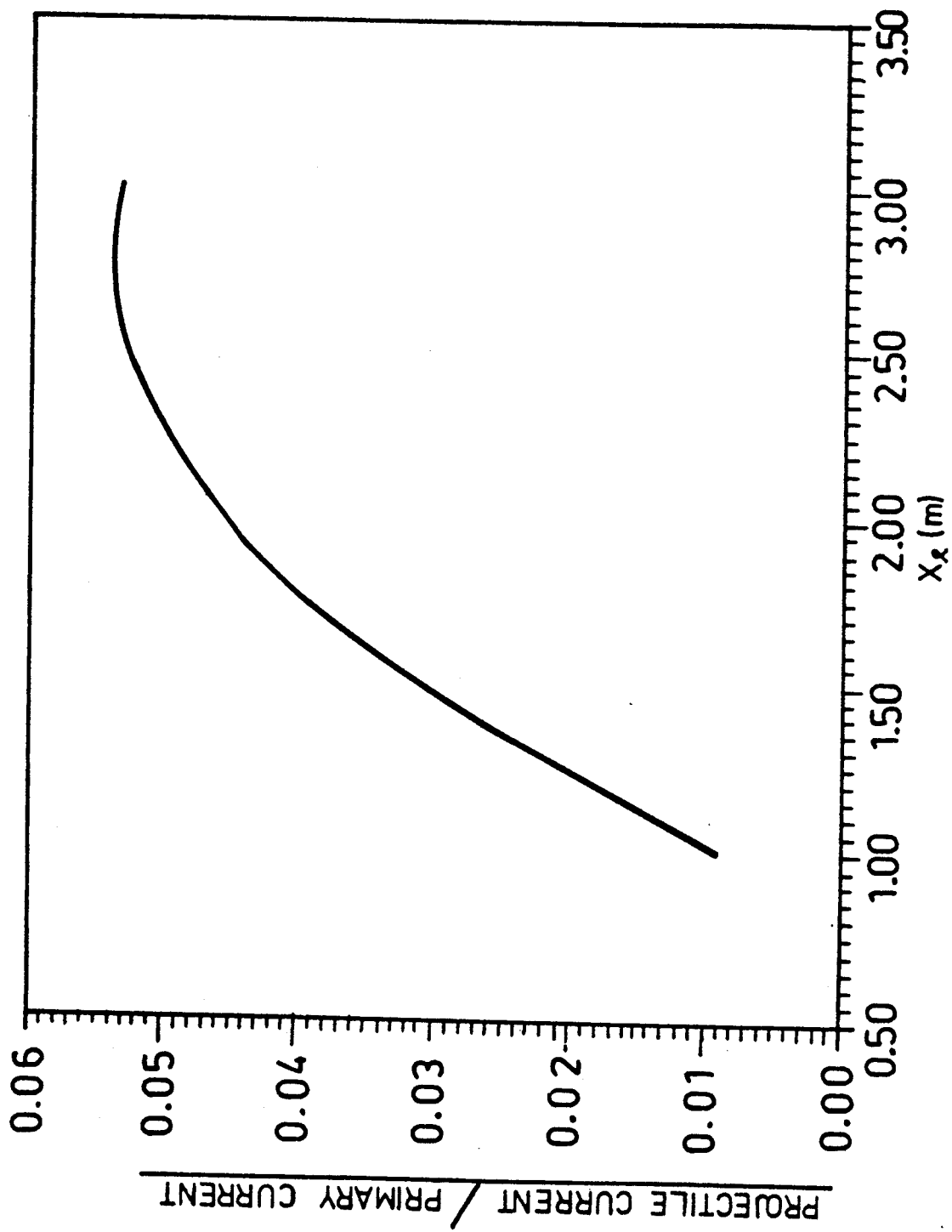
Figure 11:
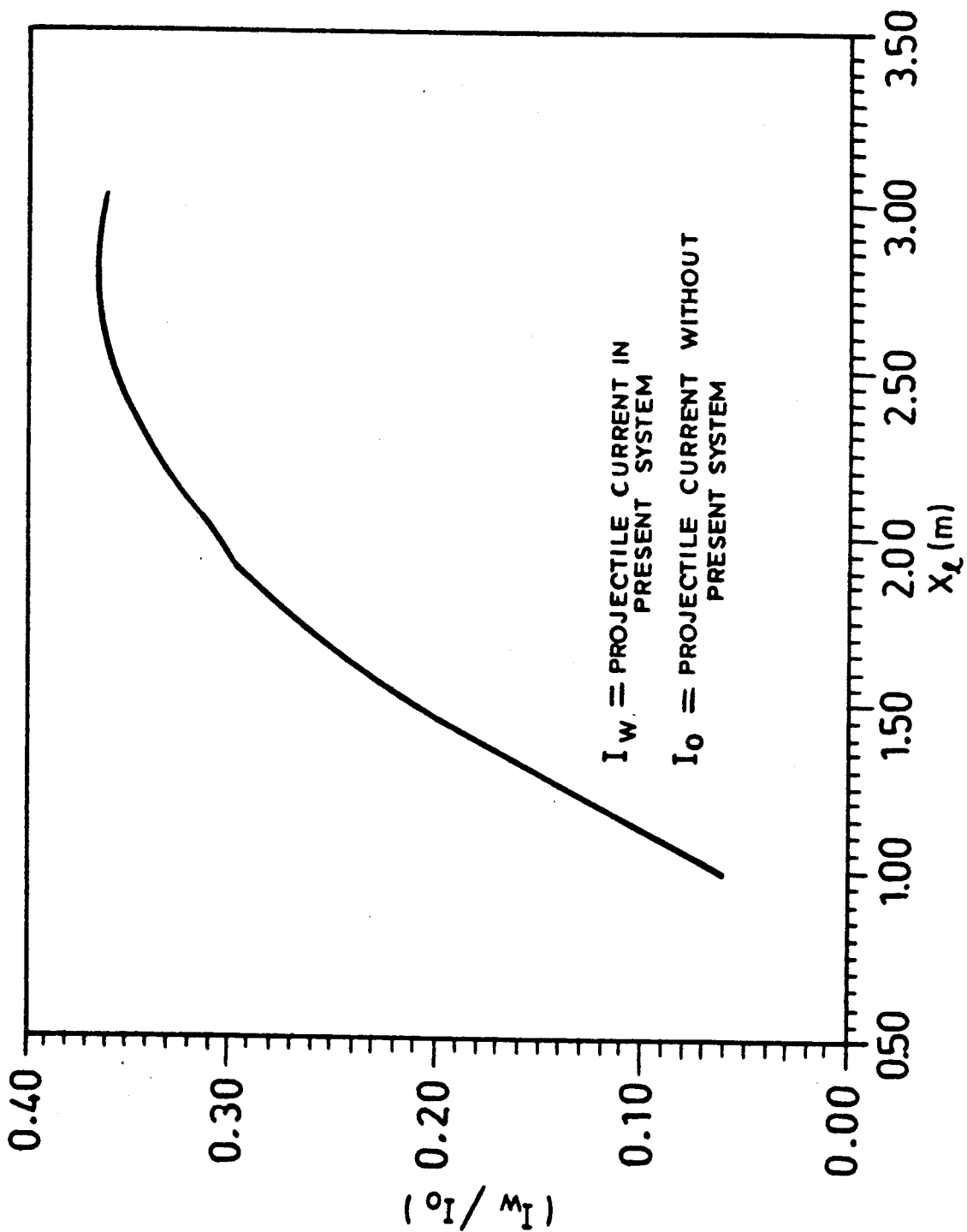

FIG. 6 is a graph which shows the energy transfer efficiency and the coupling coefficient as a function of the primary coil height, FIG. 7 is a graph which shows the secondary self inductance, $L_s$, versus x, the secondary winding height; FIG. 8 is graph which shows the ratio $M/L_s$ versus x, where M is the magnetic field strength; FIG. 9 is a schematic of the reconnection gun;

FIG. 10 is a graph which shows the net current induced in the projectile as a function of x;

FIG. 11 is a graph which shows the ratio $I_w/I_o$ versus x; and

Figure 12:
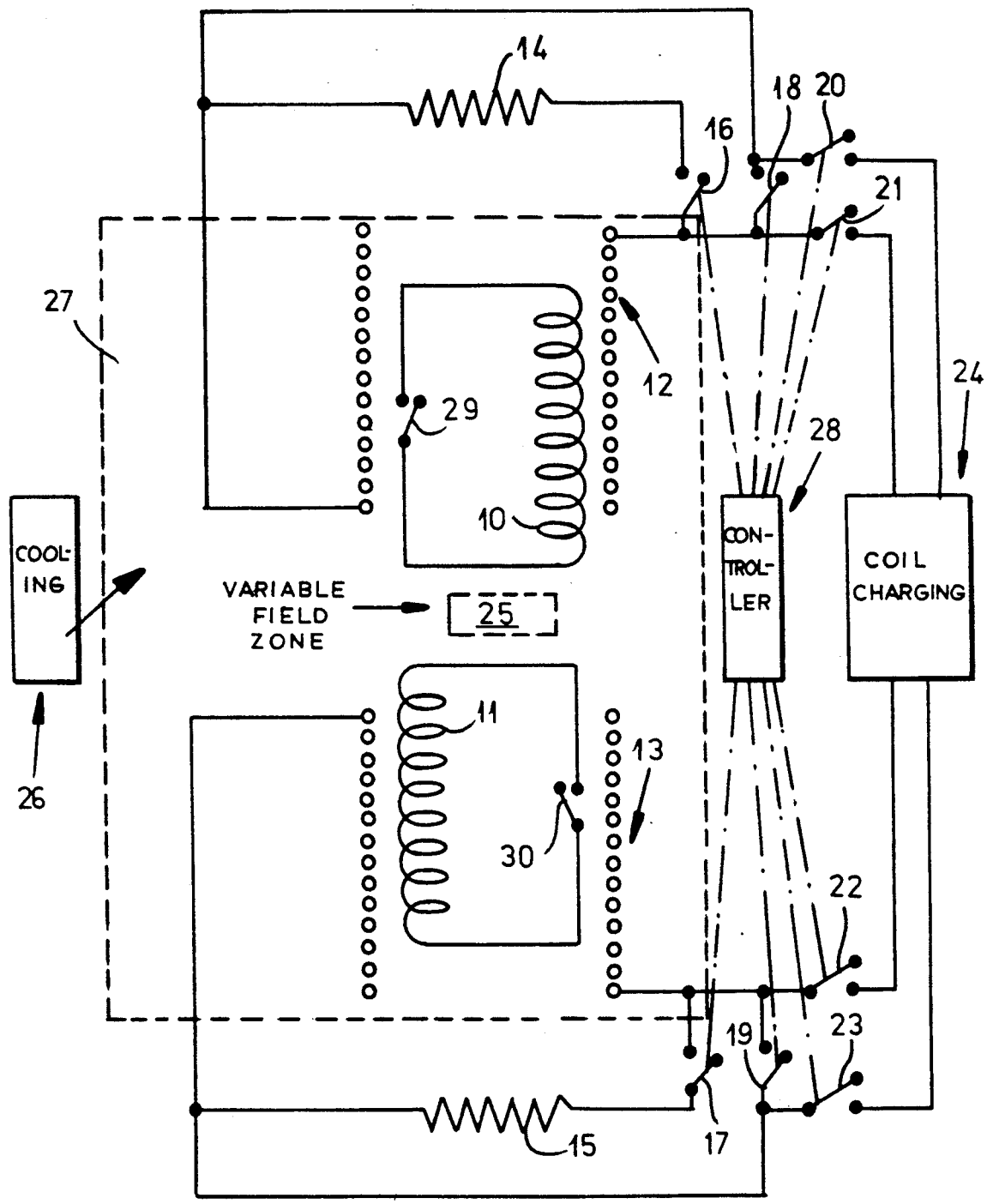

FIG. 12 is a circuit diagram according to the invention.

SPECIFIC DESCRIPTION

The system consists of primary and secondary windings as shown in FIG 1. The primary is charged slowly prior to starting the system. A transient magnetic field is produced by closing switch S1 and then opening S2 as shown in FIG. 2. Current is thus forced to transfer to the secondary. The field at point 1- FIG. 1, prior to current transfer, is low since it is far from the primary winding which is carrying the current. As the current transfers to the secondary winding, the field at point 1 increases because it is close to the region carrying the current. FIG. 3 shows the multiplication factor (defined herein as the ratio of the field at 1 after and before current transfer takes place). As can be seen a large multiplication factor can be achieved, due wholely to the use of my new invention. The ratio of the magnetic field strengths at 1, due to the secondary after the current transfer is complete, and at 2, due to the primary prior to current transfer, is shown in FIG. 4. It can be seen that the field produced at 1 using this system is more than 65 percent of the field produced by the primary if it were rapidly charged to the same energy using a gigawatt power supply. FIG. 5 shows the ratio of the secondary current $I_p$ versus the height of the secondary winding, x. The system efficiency, defined as:

Eff. $= (L_s/L_p)(I_s/I_p)2$ is shown in FIG. 6. The coupling coefficient is shown versus x on the same Figure. The ratio of the mutual inductance, M, to the secondary self inductance, $L_s$, is shown in FIG. 7 versus x. The secondary self inductance versus x is shown in FIG. 8.

DESIGN OF A ZERO PULSED POWER RECONNECTION GUN

It is recognized that the barrel effects of rail guns limit their performance in terms of maximum velocity and efficiency. The reconnection gun invented by Cowan (M. Cowan et al, "The Reconnection Gun," Proceedings of the 3rd Symposium on Electromagnetic Launch Technology, p.25., IEEE Pub., April 1986) is superior to rail guns in this regard because it has the potential of achieving high velocity and high efficiency. Since the field generating coils of the reconnection gun have to be charged in less than a millisecond, its operation requires the use of a high ultra-power conditioning device. This represents a severe limitation on the potential use of the gun. However, my new invention makes possible the use of said gun since it eliminates the need for the very high power conditioning equipment of the prior art. FIG. 9 shows a schematic of the reconnection gun using the instant invention. As the projectile moves away from the center of the gun, current transfer is triggered. The current induced in the projectile is in the same direction as the current in the primary. The net current in the projectile is shown in FIG. 10 as a function of x, the secondary superconducting coil winding. The current ratio, $I_w/I_o$, in the projectile is plotted in FIG. 11 so as to compare the performance of the gun of the prior art with that of the instant invention. $I_o$ is the projectile current using the primary coil in the same configuration as the prior art reconnection gun. $I_w$ is the projectile current using the configuration of the instant invention.

In the prior art apparatus, the coils remain charged after firing the gun and must be discharged to prepare for the next firing. This mandates additional apparatus to recover the energy so as to improve the overall efficiency of the system. By using the apparatus of my new invention, wherein the coils are constructed from high critical temperature superconducting wires, the said coils can carry current at all times and do not need to be discharged. Energy can be transfered back to the primary winding to prepare for next shot.

It has also be found in the prior art that high current solenoids are required for reconnection guns, so as to limit the charging voltage. I have determined that this is also the case using the present invention when an external resistor is used for current transfer. However, the use of superconductive windings of the instant invention makes it possible to use low current windings without generating high internal voltage.

CONSTRUCTION OF THE SUPERCONDUCTIVE PRIMARY WINDINGS

I have established that the use of high critical temperature superconducting wires for the primary windings is extremely attractive in terms of energy required and energy saved, over that of the prior art systems for construction of reconnection guns. I have further determined that the energy loss is not significant as compared to using low temperature superconductors. In the design of the instant invention, the use of high critical temperature superconductive windings does reduce requirements of voltages used by the system by orders of magnitude. In the use of my new invention, operation of the system requires driving the primary winding uniformly normal to induce current transfer. Since coil inductance and resistance are uniformly distributed along the coil, the inductive and the resistive voltage cancels each other locally, resulting in a small internal voltage.

FIG. 12 illustrates in more detail an apparatus, according to the invention, for generating a controlled magnetic field in a space 25 which can receive a projectile, if desired, as previously described to drive that projectile laterally form the zone by inducing a reactive magnetic field in a superconductive coil of that projectile.

The apparatus here comprises two closed-loop secondary superconductive coils 10 and 11 which are axially aligned with one another but spacedly juxtaposed across the variable field zone 25 which constitutes the location at which the controlled field is to be applied.

Each of the secondary coils 10, 11 is received partially in and is coaxial with a primary coil 12, 13 which can be operated as an open-loop coil or as a closed-loop coil, as can be described. The coils 12, 13 are likewise composed of superconductive material and the materials of all of the coils may be any of the high-temperature superconductive ceramic oxides previously described in any convenient form allowing the coil to be fabricated. The coils are received in a zone, represented generally at 27, which can be brought to a temperature below the critical temperature $T_c$ by a cooling means represented at 26, e.g. a source of liquid nitrogen. High temperature superconductive ceramic oxides are, as defined herein, superconductors having a critical temperature $T_c$ above 23° K.

The primary coils can have their terminals bridged or shunted by switches 18 and 19 to establish the closed-loop configuration. Also connectable across the terminals of the primary coils are resistive loads 14 and 15, respectively, in series with switches 16 and 17.

Furthermore, a source of coil-charging direct current, represented at 24 can be connected by switches 20, 21 to the terminals of the primary coil 12 and by switches 22 and 23 of the primary coil 13.

While the switches may be operated manually, I prefer to provide a common controller 28 for the various switches for the proper sequencing of them.

To generate a substantially instantaneous high magnetic field in the variable field zone 25, both primary coils 12 and 13 can be charged at a relatively low rate by coil charging source 24 upon closure of the switches 20, 21, 22, and 23. Switches 29 and 30 remain open during primary winding charging.

When the desired level of electric current has been stored in the primary coils 12 and 13, the switches 20-23 are opened to disconnect the charging current source 24 and the shunt switches 18 and 19 are closed, thereby storing the electric current in the superconductive coils 12 and 13 until a high power transfer of current to the secondary coils 10, 11 is desired.

Without requiring a high power source capable of delivering instantaneous high currents, I am able to simultaneously open one or both of the switches 29 and 30 simultaneously close one or both of the switches 18 and 19, and simultaneously close one or both of the switches 16 and 17 so that electric current paths are established for the primary coils with the respective resistive loads and a decaying magnetic field is established in each of the primary coils.

As will be apparent from the foregoing discussion, each secondary coil 10, 11 is inductively coupled with the respective primary coil so that an electric current is induced therein and circulates in that closed-loop secondary coil. Large currents can be transferred in short periods in this manner.

Naturally, the electric current traversing the secondary coils will generate in the space 25 an appropriately controlled magnetic field which, as described, can be used to drive a projectile or for any other purpose for which a controlled magnetic field may be useful.

It will be apparent that the primary windings can be discharged simultaneously or in staggered relationship, cyclically or aperiodically. Furthermore, one of the primary windings may be charged without the source 24 with its shunt switch closed by inductive charging of its secondary winding across the space 25 by the discharge of the other primary winding. External resistance 14 and 15 can be used for discharge but 1 hour internal voltage can be excessive. The discharge can be achieved by triggering the primary winding normal thus providing the necessary equivalent resistances to 14 and 15. This will significantly reduce the induced voltages, make the insulation between the primary and the secondary less thickness, increase coupling and thus increase system efficiency.

I claim:

1. A method of generating and controlling a magnetic field at a predetermined location, which comprises the steps of:
   (a) providing a superconductive primary coil spaced distally from said location and disposing in coaxially overlapping relation with said primary coil a superconductive closed-loop secondary coil extending axially beyond said primary coil proximal to said location;
   (b) charging said primary coil with an electric current across terminals of said primary coil and then shunting said terminals to form a closed loop from said primary coil thereby storing electric current in said primary coil; and
   (c) causing the stored electric current in said primary coil to decay at least partially and at least in part by quenching superconductivity of said primary coil at least in part by connecting said primary coil across a resistive load, thereby generating a varying magnetic field and inducing with said varying magnetic field an electric current in said secondary coil so that a controlled magnetic field is generated by said secondary coil at said location.

2. The method defined in claim 1 wherein said secondary coil is inserted coaxially in said primary coil.

3. The method defined in claim 2 wherein said secondary coil is inserted into said primary coil over only part of an axial length thereof.

4. The method defined in claim I wherein said magnetic field generated at said location induces an electric current in a superconductive coil of a projectile to propel said projectile.

5. The method defined in claim 1, further comprising the step of positioning another superconductive primary coil and a respective secondary coil juxtaposed therewith across said location from the first mentioned primary and secondary coils and operating said other superconductive primary coil and its respective secondary coil with steps (b) and (c).

6. An apparatus for generating and controlling a magnetic field at a predetermined location, which comprises:

a superconductive primary coil having a pair of terminals and spaced distally from said location;
a superconductive closed-loop secondary coil coaxially overlapping with said superconductive primary coil and extending axially beyond said primary coil proximal to said location;
means for charging said primary coil with an electric current across terminals of said primary coil and then shunting said terminals to form a closed loop from said primary coil thereby storing electric current in said primary coil; and
means including a resistive load connectable in series with said primary coil and for quenching superconductivity in said primary coil for causing the stored electric current in said primary coil to decay at least partially, thereby generating a varying magnetic field and inducing with said varying magnetic field an electric current in said secondary coil so that a magnetic field is generated by said secondary coil at said location.

7. The apparatus defined in claim 6 wherein said secondary coil extends coaxially in said primary coil.

8. The apparatus defined in claim 7 wherein all of said coils are coaxial.

9. The apparatus defined in claim 8 wherein said means for charging said primary coil with electric current includes a direct-current source and switch means for connecting said source across said terminals and then disconnecting said source from said terminals.

10. The apparatus defined in claim 9 wherein said means for shunting includes a switch connected across said terminals, and said means for causing the stored electric current in said primary coil to decay includes a resistive load and switch means for connecting said resistive load across said terminals.

11. The apparatus defined in claim 6 wherein means for charging said primary coil with electric current includes a direct-current source and switch means for connecting said source across said terminals and then disconnecting said source from said terminals.

12. The apparatus defined in claim 6, further comprising a projectile disposed at said location and magnetically propelled by the magnetic field generated by said secondary coil.

13. The apparatus defined in claim 12 wherein said projectile is formed with a closed-loop superconductive coil.

14. The apparatus defined in claim 6, further comprising another superconductive secondary coil spaced from the first-mentioned secondary coil across said location, another superconductive primary coil juxtaposed with said other secondary coil, means for charging said other primary coil with an electric current across terminals of said other primary coil and then shunting said terminals of said other primary coil to form a closed loop from said other primary coil thereby storing electric current in said other primary coil, and means including a resistive load connectable in series with said primary coil and for quenching superconductivity in said primary coil for causing the stored electric current in said other primary coil to decay at least partially, thereby generating a varying magnetic field and inducing with said varying magnetic field and electric current in said other secondary coil.

15. The apparatus defined in claim 14 wherein all of said coils are coaxial.

16. The apparatus defined in claim 6 wherein said means for shunting includes a switch connected across said terminals.

* * * * *